US012135179B1

(12) United States Patent
Shull

(10) Patent No.: US 12,135,179 B1
(45) Date of Patent: Nov. 5, 2024

(54) SYSTEM AND METHOD FOR DETECTING MOVEMENT OF A FIREARM

(71) Applicant: TRAC SHOT LLC, High Point, NC (US)

(72) Inventor: Geoff Shull, High Point, NC (US)

(73) Assignee: Trac Shot LLC, High Point, NC (US)

( * ) Notice: Subject to any disclaimer, the term of this patent is extended or adjusted under 35 U.S.C. 154(b) by 0 days.

(21) Appl. No.: 18/615,688

(22) Filed: Mar. 25, 2024

(51) Int. Cl.
*F41A 17/06* (2006.01)
*G08B 25/10* (2006.01)
*H01H 35/02* (2006.01)

(52) U.S. Cl.
CPC ............ *F41A 17/063* (2013.01); *G08B 25/10* (2013.01); *H01H 35/02* (2013.01)

(58) Field of Classification Search
None
See application file for complete search history.

(56) References Cited

U.S. PATENT DOCUMENTS 8,523,185 B1 * 9/2013 Gilbreath ................... F41J 5/14 434/23
9,380,397 B2 * 6/2016 Kane .................... G08B 25/016
9,749,789 B1 * 8/2017 Edmonds .............. H04W 4/023
10,401,380 B2 * 9/2019 Loeffler .................. G01P 15/18
10,832,565 B2 * 11/2020 Pirkle .................. G08B 29/185
11,282,358 B1 * 3/2022 Fowler ................... G06V 40/10
11,710,191 B2 * 7/2023 Tofte ....................... G06T 11/60 705/4
12,013,200 B2 * 6/2024 von Mueller ........... F41A 19/01
2013/0297387 A1 * 11/2013 Michael ................. G06Q 30/02 705/13
2019/0222771 A1 * 7/2019 Hedeen .................. H04N 23/51
2021/0233555 A1 * 7/2021 Davis ...................... F41A 19/01
2023/0130926 A1 * 4/2023 Hangartner ........ G08B 13/1672 340/539.14
2023/0394946 A1 * 12/2023 Wells ................. G08B 21/0297

* cited by examiner

*Primary Examiner* — K. Wong
(74) *Attorney, Agent, or Firm* — Tuggle Duggins P.A.; Blake P. Hurt; Reinier R. Smit

(57) ABSTRACT

A motion detection system designed for firearms, aiming to enhance safety and security while maintaining privacy which will alert a user of movement of their firearm or firearm magazine. The present disclosure incorporates an inconspicuous motion detection device, resembling a firearm bullet, to be inserted into a firearm or firearm magazine. This device includes a first communication module, first power source, electrical switch, and first microcontroller, all housed in a bullet-like casing. The system detects motion without transmitting personal location data, using an ultra-high radio frequency and an electrical switch configured to detect a change in position or orientation to maximize battery life. The motion detection device communicates with a base station, which communicates with a secure server network, ultimately sending notifications to a user's mobile device that the firearm or firearm magazine is being moved. The discreet design and non-reliant GPS technology of the system prioritizes firearm owner privacy.

20 Claims, 4 Drawing Sheets

SYSTEM AND METHOD FOR DETECTING MOVEMENT OF A FIREARM

FIELD OF THE INVENTION

The disclosure herein pertains to motion detection systems, and more specifically, motion detection systems designed to be energy-efficient and discreet for use with firearms and related accessories.

DESCRIPTION OF THE PRIOR ART AND OBJECTIVES OF THE INVENTION

Safety and security are paramount when it comes to owning a firearm, and this is particularly true for storage. Currently, secure storage efforts involve mechanisms such as trigger or chamber locks, alone or in combination with safes or vaults. These systems may prevent immediate access to the firearm; however, they fail to give the owner certain information regarding the movement of the firearm or ammunition. Furthermore, these systems are conspicuous and fail to be easily paired with a firearm and/or firearm-related accessory, such as a firearm magazine for holding ammunition.

The misuse of global positioning systems may worry gun owners, particularly as it relates to privacy concerns. Attempts to provide a system capable of notifying the owner of a firearm as to movement of the firearm have fallen short because they provide too much personal identifying information, particularly a specific geographic location via GPS. This information may be hacked or used by third-parties that may use it to locate firearms. For this reason, it is desirable to have an inconspicuous system configured to detect motion of a firearm and alert a user of the detection without using GPS or other location-tracking technologies. The absence of GPS technology prioritizes privacy and security, as the mere notification of movement is enough to cause a firearm owner to inspect the situation for themselves and be made aware from where the firearm moved.

Thus, in view of the problems and disadvantages associated with prior art devices and systems, the present disclosure was conceived and one of its objectives is to provide a system for detecting motion and notifying a user of the motion, without creating or transmitting personal identifying information capable of determining the location of the system.

It is another objective of the present disclosure to provide a system capable of inconspicuously pairing with a firearm or firearm magazine and configured for detecting motion of the firearm or firearm magazine and notifying a user of the motion, without creating or transmitting personal identifying information capable of determining the location of the system.

It is still another objective of the present disclosure to provide an ultra-high radio frequency motion detection system that maximizes the battery life available to power the system by including a tilt switch, configured to determine motion and thus be considered motion-activated, to detect motion and provide power to the system for a predetermined period of time after motion is detected.

It is still a further objective of the present disclosure to provide an inconspicuous system for monitoring and notifying the owner of movement of the firearm and/or firearm magazine.

It is yet a further objective of the present disclosure to provide a system including an inconspicuous motion detection device capable of transmitting a brief signal when an electrical switch is activated to a base station, a network, and then to a user's mobile device.

It is another objective of the present disclosure to provide a system including an inconspicuous motion detection device capable of loading into a chamber of a firearm or a firearm magazine to prevent misfire, unauthorized fire, or accidental discharge.

Various other objectives and advantages of the present disclosure will become apparent to those skilled in the art as a more detailed description is set forth below.

SUMMARY OF THE INVENTION

The aforesaid and other objectives are realized by providing a motion detection system including an inconspicuous motion detection device configured for wireless communication with a base station, the base station configured for wireless communication with the motion detection device and a wireless network, a secure server network configured for wireless communication with the base station and a mobile device configured for wireless communication with the secure server network. The inconspicuous motion detection device includes a casing configured to mimic the casing of a firearm bullet, meaning that the inconspicuous motion detection device is insertable into a firearm magazine. The casing defines a hollow interior void defined by the geometry (i.e., caliber) of the casing. The casing houses and encapsulates a communication module, a power source or battery, an electrical switch module, and a microcontroller module. The communication module is configured for wireless communication with the base station and may include, inter alia, RF (radio frequency), Bluetooth®, and/or WiFi capable communications. The microcontroller module is configured for electrical communication with an electrical switch. The electrical switch module may be configured to detect motion and complete a circuit between the communication module, the power source, and the microcontroller module for a predetermined period of time, thereby facilitating power to the system. The communication module is configured to transmit a first signal to the base station for the predetermined period of time, after which the electrical switch cuts off or breaks the circuit of the system and the power source or battery no longer provides power to the rest of the system. After motion is detected, the inconspicuous motion detection device will be considered "active" and may transmit the first signal to the base station for the predetermined period of time. After the predetermined period of time has concluded, the inconspicuous motion detection device will be considered "passive" and ceases the transmission of the first signal to the base station. Additionally, or in the alternative, the inconspicuous motion device may transmit a first signal to the base station in a predetermined patter, sequence, or cycle for the aforementioned predetermined period of time before returning to the "passive" configuration. The device may remain in the passive configuration until the electrical switch detects motion again.

The communication module is configured for electrical communication with the microcontroller module, wherein the microcontroller module includes a processor for executing one or more instructions stored on a memory. The processor includes hardware configured to execute instructions by reading a set of instructions stored on the memory, which may include a non-transitory computer-readable storage medium storing executable instructions. The memory may be a random access memory (RAM) device, a read-only memory (ROM) device, a memory card, a magnetic or optical recording medium and a corresponding drive, or any similar member device known in the art.

The communications module is configured to transmit the first signal, which is programmed to include a limited amount of personal identifying information, to further reduce the amount of power required to transmit the first signal to the base station. The first signal may contain other information that cannot be used to determine precise location, such as a battery life status and identifying information relating to the inconspicuous motion detection device. Stated differently, unlike the prior art references, which package personal identification information, capable of determining precise location of a system, the present disclosure only transmits information which cannot be used to determine precise location of a given instrument, in one or more embodiments, a firearm or a firearm magazine.

DETAILED DESCRIPTION OF THE PREFERRED EMBODIMENT AND OPERATION OF THE INVENTION

Figure 1B:
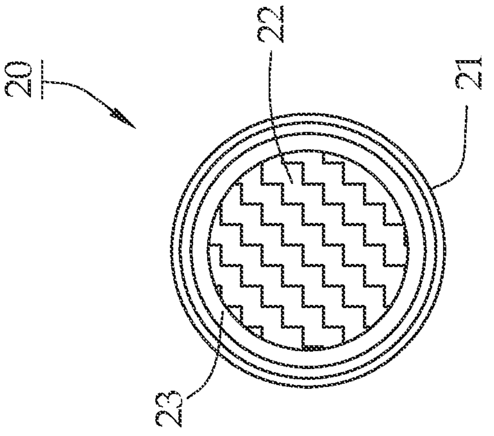
FIG. 1B illustrates a top view of the inconspicuous motion detection device of the system.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

As used herein, "wired communication" refers to the transmission of data over a physical medium, such as cable or wire. This mode of communication typically involves the use of metal conductors like copper or fiber optics, where data is transmitted via electrical signals (in the case of copper) or light signals (in the case of fiber optics). Wired communication is often characterized by its stable connection, high data transfer speeds, and lower risk of interference compared to wireless methods. As used herein, "wireless communication" refers to the transmission of data over distances without the need for electrical conductors or wires. This type of communication uses signals such as electromagnetic waves, for example radio frequencies, to transmit data through the air. Hardware capable of facilitating both wired and wireless communication may include processors and controllers (for managing the data transmission and reception, whether over wired or wireless mediums), transceivers (for sending and/or receiving signals over RF, Bluetooth®, or WiFi), ports and connectors (for wired communication), antennas (for wireless communication), memory (for storing executable instructions and information relating to signals), and a processor (for executing the stored instructions).

As used herein, a firearm is a weapon that launches one or more projectiles at high velocity through the confined burning of a propellant. Firearms are commonly classified into several categories, with the most prevalent being handguns, rifles, and shotguns. However, there exists a wider variety of firearms beyond these conventional types. The basic components of a firearm include the barrel (the long tube through which the projectile travels when fired) and the action (the mechanism that handles loading, firing, and unloading of ammunition). The chamber is the part of the barrel or action where the ammunition is inserted before being fired. The firearm magazine is generally defined as a storage and feeding device within or attached proximate the chamber and can allow ammunition, and the motion detection device, to be loaded into the chamber from the firearm magazine. As will be described further below, the motion detection device of the system described herein may be adapted to be inserted into the chamber or firearm magazine but is incapable of being fired or launched because the motion detection device does not include any propellant. For this reason, the motion detection device disclosed herein is configured to act as a device that prevents misfiring, unintended or unauthorized discharge, in addition to its other benefits as a component of the system described below.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

Figure 1A:
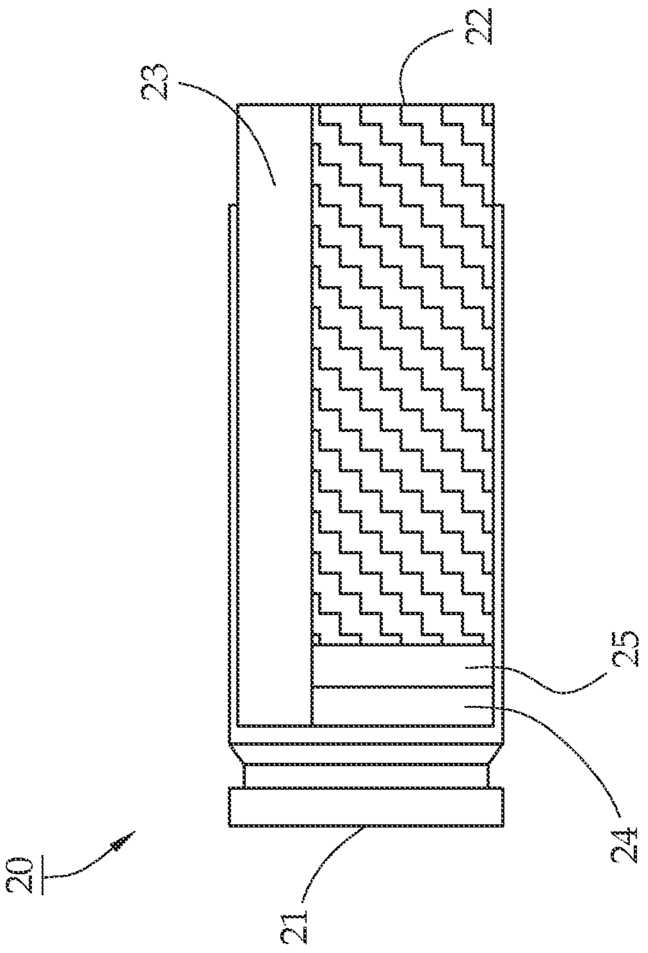
FIG. 1A shows a side view of the inconspicuous motion detection device of the system with a portion of the motion detection device cutaway to illustrate the components housed within the motion detection device.
Figure 2:
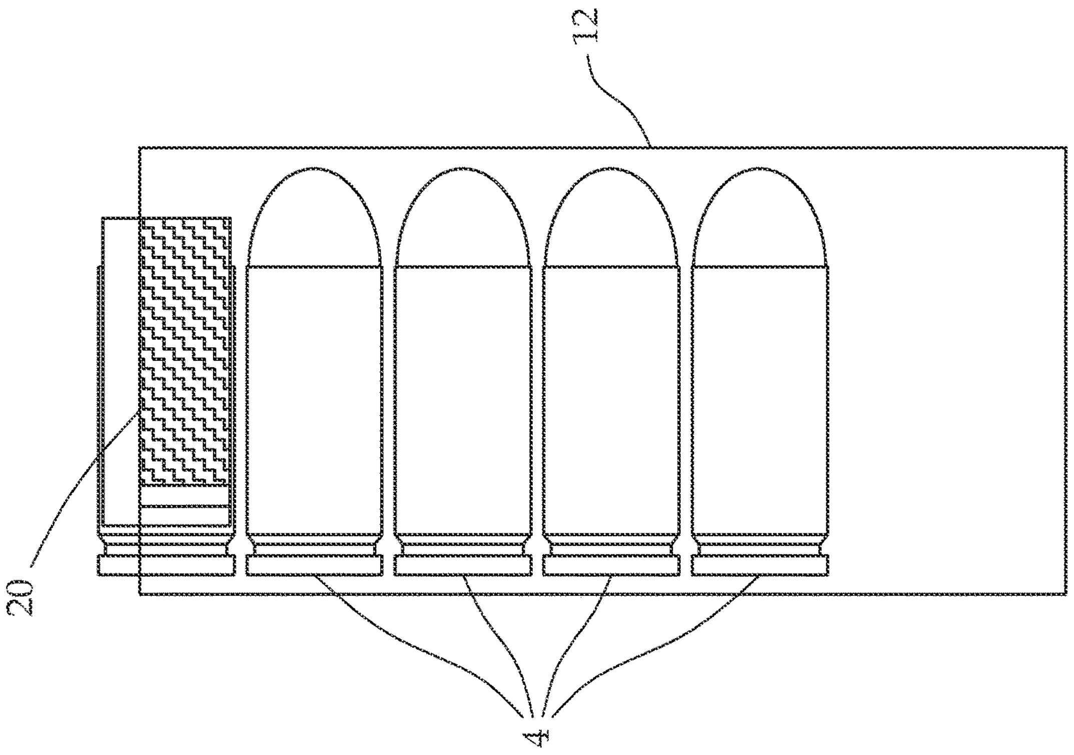
FIG. 2 pictures the inconspicuous motion detection device disclosed in FIG. 1 loaded into a firearm magazine.

For a better understanding of the disclosure and its operation, turning now to the drawings, FIGS. 1-4 demonstrate a preferred motion detection system 10 for inconspicuously pairing with a device such as, in the preferred embodiment, a firearm 11 or firearm magazine 12. The system 10 includes the motion detection device 20, a base station 30, a network server 40, and a user device such as either a desktop or laptop 50 or a mobile device 60 such as a tablet computer or cell phone that may be configured for wired or wireless communication with the network server 40. The casing 21 of the motion detection device 20 is designed to allow for efficient and discreet detection and notification of movement for a given instrument, in one or more embodiments, a firearm 11 or a firearm magazine 12. The casing 21 is configured to represent and essentially mimic the geometry (i.e., size, shape, or caliber) of a particular firearm ammunition such as seen in FIG. 2 by ammunition 14 so that the motion detection device 20 may remain inconspicuous and may even be adapted for insertion into the firearm 11 or firearm magazine 12. In embodiments where the motion detection device 20 is inserted into a chamber of a firearm 11 (not shown), the motion detection device 20 is not capable of being fired, in turn acting as an apparatus for preventing misfire, unauthorized fire, or accidental discharge. The motion detection system 10 is designed to provide an inconspicuous method of detecting and communicating motion events, without consisting of hardware or information capable of determining exact positioning (i.e., GPS). The primary component of preferred system 10, the motion detection device 20, has the appearance of a firearm bullet in the preferred embodiment to facilitate inconspicuous placement and operation.

As illustrated in FIG. 1A, the motion detection device 20 includes an embodiment of a casing 21. In the preferred embodiment, the casing 21 is manufactured to resemble a typical firearm bullet of any predetermined caliber. This design is pivotal for ensuring that the motion detection device may be deployed in various environments without drawing attention and may even be adapted for insertion into the chamber of a firearm. The casing 21 may be manufactured of any material; however, ideally will be manufactured out of a durable material capable of concealing the internal components including the communication module 22, the power source 23, the electrical switch module 24, and the microcontroller module 25), such as a metallic material. A metallic material, such as brass and steel, allow the motion detection device 20 to be inserted and removed multiple times from a firearm chamber or firearm magazine without deforming or becoming damaged.

The preferred microcontroller module 25 may be configured to electrically communicate with one or more other components within the casing. Although not shown, as would be understood the microcontroller module 25 includes the processor having hardware configured to execute instructions by reading a set of instructions programmed on the memory. In the preferred embodiment, the microcontroller module 25 may include an electrical switch module or tilt switch 24 configured to be sensitive to changes in orientation or position, and upon detection of changes in orientation or position, initiates the activation of the communication module 22 for a predetermined period of time. Upon activation of the communication module 22, the motion detection device 20 may wirelessly communicate with the base station 30.

The preferred embodiment of the memory of the motion detection device 20 defines a non-transitory computer-readable medium configured to store a set of instructions that when executed, perform steps including: upon the detection of motion via the electrical switch 24, initiating the activation of the microcontroller module 25 for a predetermined period of time, for the predetermined amount of time after the detection of motion transmitting a first signal 26 via the communications module 22 within the motion detection device 20, and after the predetermined period of time has concluded, ceasing the transmission of the first signal 26.

In the context of the motion detection device 20, the integration of an electrical switch 24 is important for detecting unauthorized movement of an object, such as a firearm 11 or its firearm magazine 12. In a preferred embodiment, the electrical switch 24 is defined as a tilt switch. A tilt switch is generally understood to be a type of electrical switch that activates or deactivates an electrical circuit based on the orientation or position of the device. When the orientation of the switch changes beyond a predetermined angle, it causes a change in the state of the switch, which is often used to signal the presence of motion. The tilt switch generally includes a housing with a conductive material and electrical contacts positioned within the housing. When motion is detected, the tilt switch completes the electrical circuit, enabling power distribution and communication within the device, thereby activating the motion detection functionality. This feature is crucial for the discreet and efficient operation of the system 10, providing a simple yet effective way to monitor movement without the need for complex positioning systems or GPS. Additional related technologies may be used as the electrical switch 24 or may be used in combination with the tilt switch 24. Additional technologies that may enhance the ability to detect motion include accelerometers—to measure and detect acceleration forces, gyroscopes—to measure and detect rotational forces. The electrical switch 24 may include its own microcontroller configured and programmed with logic to process signals from the electrical switch and make intelligent decisions about the state of the motion detection device 20, for example, if the motion detection device is "active" or "passive".

The preferred motion detection device 20 is considered "active" while the communications module 22 of the motion detection device 20 is transmitting the first signal 26. The microcontroller module 25 is configured to detect motion via the electrical switch 24, and then provide power to the rest of the motion detection device 20 for the predetermined period of time. The predetermined period of time may be a continuous period without any break (i.e., transmit the first signal 26 for ten seconds straight) or may be a non-continuous period with interval breaks (i.e., transmit the first signal 26 for one second every nine seconds for one minute). Upon completion of the predetermined period, the motion detection device 20 is considered "passive" and will enter into a low power mode wherein the transmission of the first signal 26 ceases. When in low power mode, the electrical switch 24 may cut off or break the circuit of the system and the power source or battery no longer provides power to the rest of the system. This predetermined time may be programmed into the instructions stored on the memory of the microcontroller and executable by the processor of the microcontroller.

In the preferred embodiment, the first signal 26 contains information relating to the detection of motion and cannot be used to determine precise location. The first signal 26 may include a signal encoded to send a notification that motion has been detected and nothing more. In other situations, the first signal 26 may also be encoded to send a notification that the battery level is low. In the preferred embodiment, the information of the first signal 26 is devoid of information capable of determining precise location, instead contains information solely focused on the occurrence of motion. The information of the first signal 26 may be limited (i.e., only send motion notification) to preserve the battery life of the motion detection device 20. The information may also include an identifying name of a particular motion detection device 20, the signal strength between the motion detection device 20 and the base station 30, and/or a date and time when the first signal 26 was transmitted.

The communication module 22 may be configured in electrical communication with the microcontroller module 25 and configured to transmit the first signal 26. The communications module 22 may utilize hardware known by those of ordinary skill in the art for transmitting a signal wirelessly, which may include RF (radio frequency), Bluetooth®, and/or WiFi capable communications. It is preferred to use a low power means of transmission; therefore, it is preferred that the communications module 22 includes hardware configured to transmit a low power, ultra-high frequency (UHF) band. The ultra-high frequency band refers to the radio frequency band ranging from 300 MHz to 3 GHz. The UHF bands have shorter wavelengths than low frequencies, which directly influence their transmission characteristics (i.e., factors like range, data rate, power consumption, and regulatory environment). In a preferred embodiment, the communication module transmits the first signal 26 using the 433 MHz band. The 433 MHz band offers low-power consumption, relatively long-range, and the ability to penetrate though certain obstacles (i.e., walls). As would be understood by those skilled in the art, the 433 MHz is ideal due to its impressive point-to-point range, typically over 100 meters (300 feet), which is around five times longer than other types of hardware capable of transmitting a wireless signal, such as Wi-Fi (2.4/5.8 GHz band). In an alternate preferred embodiment, the communication module transmits the first signal 26 utilizing a 900 MHz band.

As demonstrated by FIG. 2, the motion detection device 20 may be inserted into a firearm magazine 12 to allow inconspicuous placement and operation. Although the casing 21 shown in FIG. 1*a* and FIG. 2 depicts a nine millimeter (9 mm) bullet, the casing may be configured to essentially mimic other bullet calibers, including, but not limited to, .223/5.56 ammunition, 12 gauge shotgun ammunition, .308 ammunition, and 40 caliber ammunition. Although not shown in the figures, it shall be understood that the motion detection device 20 may also be adapted to be inserted directly into the chamber of the firearm. Motion detection systems 10 configured to be adapted into the chamber of the firearm may prevent misfiring or unintended discharge of the firearm because the motion detection device 20 is incapable of being fired, due to the lack of propellant found in typical firearm ammunition.

The first signal 26 is transmitted by the motion detection device and is encoded to be received by the base station 30. Although not shown as would be understood the base station 30 includes a second communication module, a second processor, a second memory, and a second power source. The second communication module may include hardware configured to receive the first signal 26 from the motion detection device 20 and transmit a second signal 27 to the network server 40. In some embodiments, the second signal 27 may be encoded to include the same information as the first signal 26, but in other embodiments, the first signal 26 may only be encoded to include a notification that motion was detected, and when received by the base station 30, the second signal 27 may be encoded to include the first signal 26 and other, additional information. The information of the second signal 27, like the first signal 26, is devoid of information capable of determining precise location.

The base station 30 includes a second processor including hardware configured to execute instructions by reading a set of second instructions programmed on a second memory. The base station 30 is configured to wirelessly communicate with the motion detection device 20 and communicate, via wired or wireless communication, with the network server 40. The second memory defines a non-transitory computer-readable medium configured to store a set of second instructions that when executed, perform steps comprising: upon wirelessly receiving the first signal 26 from the motion detection device 20, transmitting the second signal 27 to the network server 40, via wired or wireless communications. In embodiments wherein the first signal 26 contains the minimal amount of information (i.e., the notification that motion has been detected), the set of second instructions may further include the step of decoding the information from the first signal 26, and then encoding the second signal 27 to include the information of the first signal 26 (e.g., the notification that motion has been detected) and further include additional information such as, but not limited to, an identifying name of a particular motion detection device 20, signal strength between the motion detection device 20 and the base station 30, and/or a date and time when the first signal 26 was received.

The network server 40 includes hardware to communicate with both the base station 30 and the user device 50 or 60. The base station 30 may communicate via wired or wireless communication with the network server 40. As would be understood and known in the art, the user device 50 or 60 may include hardware configured to allow the user device to communicate via wired or wireless communication with the network server 40. The network server 40 includes a database memory including hardware configured to store information as is known in the art relating to the second signal 27. The database memory defines a non-transitory computer-readable medium configured to store information relating to the second signal 27. The user device 50, 60 may be a mobile device 50 including hardware configured for wireless communications with the network server (i.e., cellular communications). In other situations, the user device may be a computer 60 configured for wireless communications or wired directly into the server network hardware.

Figure 3:
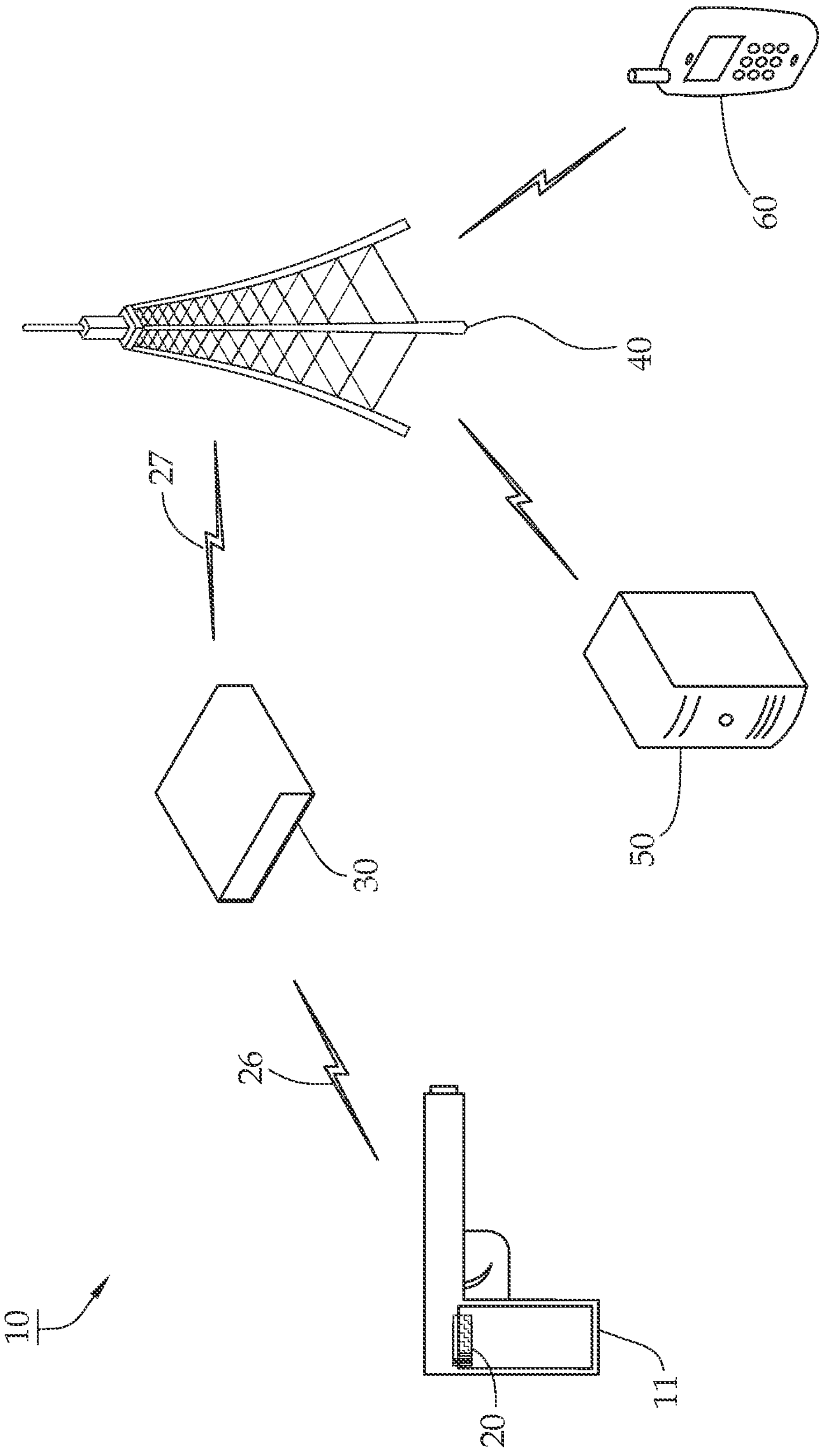
FIG. 3 depicts a schematic diagram illustrating a motion detection system including an inconspicuous motion detection device configured for wireless communication with a base station, the base station configured for wireless communication with the motion detection device and a wireless network, a secure server network configured for wireless communication with the base station and a mobile device configured for wireless communication with the secure server network.
Figure 4:
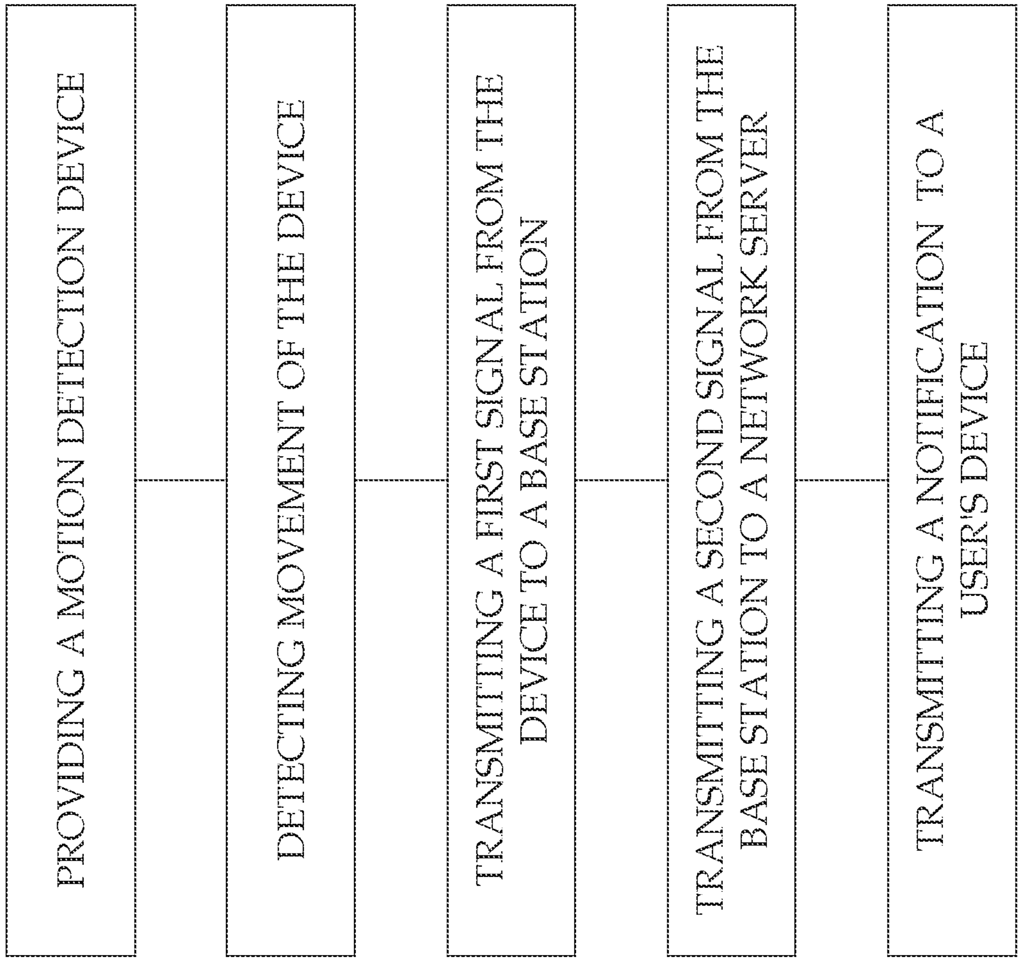
FIG. 4 illustrates a process of detecting motion of a firearm implementing the motion detection system of FIG. 1.

As FIG. 3 illustrates, the motion detection device 20 is configured to wirelessly communicate with the base station 30 via the first communication module. The base station 30 is configured with hardware to wirelessly communicate, via the second communication module, with the motion detection device 20 and the network server 40. The second communication module is configured to receive the first signal 26 transmitted by the motion detection device 20 and also configured to transmit the second signal 27 to the network server 40. The first signal 26 and second signal 27 may be identical, but in other embodiments, the base station 30 may add additional information to the first signal 26 and package such information in a second signal 27 to be received by the network server 40. The network server 40 includes a memory for storing information relating to the second signal 27 and is configured to be accessible by a user device such as either mobile device 60 or computer 50. The mobile device 60 may be configured to wirelessly communicate with the network server 40, but in other embodiments, the mobile device 60 may be configured to communicate with the network server 40 via wired communication.

The disclosure herein also contemplates a method of detecting movement of a firearm 11 or firearm related accessory such as a firearm magazine 12. As illustrated by the flow chart of FIG. 4, the method includes providing the motion detection device 20 as described in the preceding paragraphs of this disclosure. The motion detection device 20 is configured with hardware to wirelessly communicate the first signal 26 to the base station 30. The base station 30 is configured to receive the first signal 26 from the motion detection device 20 and transmit the second signal 27 to the network server 40. The method may further include detecting movement of the motion detection device 20 via the electrical switch 24 positioned within the motion detection device 20. The electrical switch 24 is preferably configured to be sensitive to changes in orientation or position. Upon detection of movement, the method includes transmitting the first signal 26 for a predetermined period of time to the base station 30 via the first communication module 22 positioned within the motion detection device 20. The first communication module 22 is configured with hardware to transmit the first signal 26. The method may also include receiving the first signal 26 via the second communication module positioned within the base station 30, the second communication module configured to receive the first signal 26 and transmit a second signal 27. The method preferably includes transmitting the second signal 27 to a network server 40 configured with a memory to store information relating to the second signal 27. The method may include providing a notification to a device 50, 60, the device 50, 60 configured to communicate with the network server 40. The method may further include pairing the motion detection device 20 with the firearm 11 or firearm magazine 12 by loading the motion detection device 20 into the chamber of the firearm 11 or by loading the motion detection device 20 into the firearm magazine 12. With respect to the step of transmitting the first signal 26 for a predetermined period of time, the predetermined period of time may be a continuous period without any break (i.e., transmit the first signal for ten seconds straight) or may be a non-continuous period with interval breaks (i.e., transmit the first signal for one second every nine seconds for one minute).

The illustrations and examples provided herein are for explanatory purposes and are not intended to limit the scope of the appended claims.

I claim:

1. A system for detecting movement, the system comprising:

a motion detection device, the motion detection device including a housing defining a hollow interior void for retaining a first communication module, a first power source, a first electrical switch, first memory, and a first microcontroller module;

a base station, the base station device including a second communication module, a second processor, a second memory, and a second power source; and a network server, wherein the housing defines a geometry that mimics a predetermined bullet caliber capable of pairing with a firearm or magazine of the firearm.

2. The system of claim 1 wherein the first communication module, first power source, first electrical switch, first memory, and first microcontroller module are in electrical communication.

3. The system of claim 1 wherein the first communication module is configured with hardware to transmit a first signal.

4. The system of claim 3 wherein the second communications module is configured with hardware capable of receiving the first signal and transmitting a second signal.

5. The system of claim 1 wherein the electrical switch is configured to be sensitive to changes in orientation or position.

6. The system of claim 5 wherein the electrical switch defines a tilt switch.

7. The system of claim 1 wherein the first microcontroller module includes a first processor having hardware configured to execute a set of first instructions by reading the set of first instructions programmed on the first memory.

8. The system of claim 1 wherein the second processor is configured with hardware capable of executing a set of second instructions by reading the set of second instructions programmed on the second memory.

9. The system of claim 1 wherein the base station is configured with hardware capable of communicating a second signal with the network server.

10. The system of claim 1 wherein the network server includes a database memory including hardware configured to store information relating to a second signal transmitted from the second communications module.

11. The system of claim 1 wherein the housing is made of a metallic material.

12. The system of claim 1 wherein the predetermined bullet caliber is selected from a group consisting of 9 mm, .223, 5.56, 22LR, 12 gauge shotgun, .308, .45 ACP, .308 ACP, .40 S&W, and 40 Cal.

13. The system of claim 1 wherein the first communication module is configured with hardware to transmit a first signal on an ultra-high frequency band.

14. The system of claim 13 wherein the ultra-high frequency band is a 433 MHz radio frequency.

15. A method of detecting movement of a firearm, the method comprising:

providing a motion detection device configured with hardware to wirelessly communicate a first signal to a base station, the base station configured to receive the first signal from the motion detection device and transmit a second signal to a network server, and the motion detection device including a housing defining a geometry that mimics a predetermined bullet caliber, activating the motion detection device;

detecting movement of the motion detection device via an electrical switch positioned within the motion detection device, the electrical switch configured to be sensitive to changes in orientation or position;

upon detection of movement, transmitting the first signal for a predetermined period to the base station via a first communication module positioned within the motion detection device, the first communication module configured with hardware to transmit the first signal, and transmitting the second signal to the network server via the second communications module.

16. The method of claim 15, further comprising transmitting a notification to a device, the device configured to communicate with the network server.

17. The method of claim 15, wherein the predetermined period is between and including one second and sixty seconds.

18. The method of claim 15, wherein the first signal includes information about the detection of movement and a battery status of the motion detection device.

19. The method of claim 15, further comprising pairing the motion detection device with a firearm.

20. The method of claim 15, wherein the predetermined bullet caliber is selected from a group consisting of 9 mm, .223, 5.56, 22LR, 12 gauge shotgun, .308, .45 ACP, .308 ACP, .40 S&W, and 40 Cal.

* * * * *